United States Patent Office

3,424,817
Patented Jan. 28, 1969

---

3,424,817
POLYMERIC POLYHYDROXY-POLYETHER RESINS
Darrell D. Hicks, Louisville, Ky., assignor to Celanese Coating Company, New York, N.Y., a corporation of Delaware
No Drawing. Continuation-in-part of application Ser. No. 281,354, May 17, 1963. This application Feb. 1, 1967, Ser. No. 613,120
U.S. Cl. 260—834
Int. Cl. C08g 30/02, 45/12, 5/10
9 Claims

ABSTRACT OF THE DISCLOSURE

A process for preparing fusible polymeric polyhydroxy polyether resins by reacting a diepoxide resin and a monohydric alcohol in the ratio of one mol of diepoxide resin with about one mol of alcohol.

CROSS-REFERENCE TO RELATED APPLICATIONS

This is a continuation-in-part of my copending application, Ser. No. 281,354, filed May 17, 1963 and now abandoned.

BACKGROUND OF THE INVENTION

With new fields of use for polymeric coating composition creating additional markets, increased demands for specialized polymers have resulted. Where one polymeric composition is desirable for one use, another polymeric substance may be better for some other purpose. As a consequence, a variety of parallel polymeric compositions are being developed when a certain type of polymeric material shows particular promise.

One such type of polymer is the polymeric polyhydroxy resin. Polymeric polyhydroxy resins are especially useful in the coatings industry because they can be used in combination with many materials which react with hydroxyl groups. Particularly useful compositions result from the reaction of polymeric polyhydroxy resins with such cross-linking agents as aminoplast resins, phenolplast resins, polyisocyanates, polyanhydrides and the like.

Polymeric polyhydroxy polyether resins of this invention are made from epoxide resins and monohydric alcohols. It is known to react a diglycidyl ether of a dihydroxy compound with a monohydric alcohol. However, this process has always been conducted so that the product is virtually the di-alcohol substituted epoxide resin. The desired composition is monomeric in nature and the properties are conferred by long chain alcohol groups. The properties desired herein are not the properties conferred by alcohol groups, but rather the properties resulting from the polymeric structure obtained. Thus, in U.S. 2,700,030, a process is described in which the monohydric alcohol containing more than 10 carbon atoms is reacted with a polyepoxide on an equivalent basis, that is the mols of monohydric alcohol are equal to the number of epoxide groups in the polyepoxide. The resulting products, therefore, are essentially diethers and not polymeric products.

DESCRIPTION OF THE INVENTION

I have found that the polymerization of monohydric alcohols and epoxide resins can be conducted using less than one mol of monohydric alcohol per epoxide group without gel formation. Surprisingly high molecular weight polyhydroxy polyether resins are produced that are still soluble and fusible. Soluble, fusible polyhydroxy polyether resins have been prepared using as low as 1 to 1.3 mols of monohydric alcohol per mol of epoxide resin or, in other words 0.5 to 0.65 mol of monohydric alcohol per epoxide group. Soluble, fusible polyhydroxy polyether resins have been prepared from epoxide resins which are substantially free of hydroxyl groups as well as epoxide resins which contain up to as high as 10 hydroxyl groups. However, I prefer to prepare these polyhydroxy polyether resins using an epoxide resin which contains less than 2 hydroxyl groups in its molecular structure. Such an epoxide resin is the diglycidyl ether of p,-p'-dihydroxy-diphenyl dimethyl methane (Bisphenol A) which is available commercially with an epoxide equivalent weight of 180 to 200.

Theoretically, when 1 mol of a monohydric alcohol is reacted with 1 mol of an epoxide resin containing no hydroxyl groups, an infinite molecular weight resin should be produced. The polymerization, in actuality, does go to an indefinite length, but due to the course of the reaction, the molecular weight tends to stay in a workable range. When the monohydric alcohol reacts with the epoxide resin, an intermediate product results which contains an alcoholic hydroxyl group and an epoxide group. A remaining epoxide group can react with additional monohydric alcohol or it can react with the formed hydroxyl of the intermediate. Reaction of the epoxide groups with the hydroxyl groups in the polymer leads to branching and short-stopping of the polymer chain. As the reaction progresses, the epoxide content decreases, but the hydroxyl content remains constant.

As has hereinbefore been stated, a monohydric alcohol and an epoxide resin can be reacted in a molar ratio of as low as 1 to 1 without gelation. Use of less alcohol than 1 mol per mol of epoxide resin is not desirable since complete reaction without gelation is almost impossible to attain. Use of ratios of monohydric alcohol to epoxide resin greater than .7 mol alcohol per epoxide equivalent leads to low molecular weight polyhydroxy polyether compositions which form inferior films upon curing. Therefore, the desirable range of reactants for carrying out the process of this invention is a ratio of 0.5 to 0.7 mol of monohydric alcohol reacted per epoxide equivalent epoxide resin.

The epoxide resins with which the invention is concerned are those compounds which contain no more than two 1,2 epoxide groups. Such compounds are glycidyl polyethers of dihydric phenols which are made from the reaction of a dihydric phenol with epichlorohydrin or glycerol dichlorohydrin, and a sufficient amount of caustic alkali to combine with the chlorine of the chlorohydrin. Such products are monomeric or straight chain polymeric products characterized by the presence of more than one and up to two three-membered epoxide groups. Dihydric phenols which can be used for this purpose include Bisphenol A, resorcinol, hydroquinone, bis (4-hydroxyphenyl) ethane and 1,5-dihydroxynaphthalene. In preparing these glycidyl polyethers, the proportion of the chlorohydrin to dihydric phenol is in the molar ratio of at least 1.2 to 10 mols of epichlorohydrin to 1 mol of dihydric phenol.

Other epoxide resins applicable to this invention are the diglycidyl ethers of dihydric alcohols, such as the diglycidyl ether of ethylene glycol and butanediol.

In addition to glycidyl ethers, epoxide resins made by the peracid method are also suitable. Epoxide resins are readily prepared by reacting unsaturated esters, polyesters, diolefins and the like with a peracid.

The monohydric alcohols which can be used in the process of this invention are primary and secondary alcohols containing up to as high as 24 carbons atoms and having no groups reactive with epoxide groups other than their hydroxyl groups. Such alcohols include not only the hydrocarbon alcohols, but also monohydroxy ethers and monohydroxy esters. Among the primary alcohols which are contemplated in this invention are methyl alcohol, ethyl alcohol, n-propyl alcohol, n-butyl alcohol, n-amyl alcohol, 2-ethylhexyl alcohol, benzyl alcohol, allyl alcohol, linoleyl alcohol, hydroxyethyl phenol, hydroxyethyl methacrylate, methyl Cellosolve, butyl Cellosolve, methyl Carbitol, butyl Carbitol and the like. Secondary alcohols include isopropyl alcohol, s-butyl alcohol, 2-hydroxypropyl cresol, 1-butoxyethoxy-2-propanol, 2,6-dimethyl-4-heptanol, 2-hydroxypropyl acrylate, 7-ethyl-2-methyl-4-undecanol, and the like. Although alcohols that contain as high as 24 carbon atoms in their molecular structure are contemplated in this reaction, the preferred alcohols are those alcohols which contain no more than 10 carbon atoms. Polymeric hydroxyethers, that result from using the lower alcohols, cure to much harder, more mar resistant and stronger films than the polyhydroxy polyethers that are prepared using higher alcohols. The polyhydroxy polyether resins, prepared using drying oil derived alcohols, for example linoleyl alcohol and linolenyl alcohol, have found utility in the air-drying film field.

The preferred condensation catalysts for this reaction are the Lewis acids. Such catalysts are $BF_3$ and $BF_3$ complexes, for instance, the $BF_3$ ether complex, as well as $AlCl_3$, $SnCl_4$, $TiCl_4$, etc. Other acids, for example sulfuric acid, can also be used. The preferred catalyst is the $BF_3$, preferably the $BF_3$ etherate.

The polymerization is generally carried out in a solvent due to the high melting point of the resinous product and the exothermic nature of the reaction. Any solvent which is, of course, a solvent for the reactants and for the reaction product and which contains no groups reactive with epoxide groups, can be used in the operation of this invention. Such solvents include aromatic hydrocarbons, ketones, ethers and esters. However, in carrying out the various phases of this invention, some considerations must be given to the choice of solvents. For instance, when polar solvents, such as ketones, ethers and esters, are used, the monohydric alcohol and the epoxide resin can be reacted in a molar ratio of as low as 1 to 1 with no gelation, the product of reaction being a soluble, fusible resin. When aromatic hydrocarbons are used, the limiting lower molar ratio of monohydric alcohol and epoxide resin is about 1.3 to 1. When lower ratios than these are used, gelation occurs. Mixtures of hydrocarbon solvents and polar solvents can be used in this process with corresponding changes in the operable ratios of the reactants. With the considerations given herein, such changes can be readily determined by one skilled in the art.

Solvents which can be used in this process are benzene, toluene, xylene, methylethyl ketone, methylisobutyl ketone, ethylene glycol monoethyl ether acetate (Cellosolve acetate), diethylene glycol diethyl ether (diethyl Carbitol) and the like.

The condensation of these monohydric alcohols and epoxide resins can be conducted at temperatures of 20° C. to 150° C. or even up to 200° C. The upper temperature limit will, of course, be governed by the boiling point of the solvent used in the system. The preferred temperature range is 60° C. to 120° C. When temperatures below 60° C. are used, the rate of reaction is slow and long processing times are required. When temperatures above 120° C. are used, side reactions occur with resulting darkening of the reaction product.

The invention will be further illustrated by the following specific examples, but it will be understood that the invention is not limited thereto. The "parts" used in these examples is understood to be "parts by weight." The epoxide resins used in these examples are referred to as Epoxide A, B, C, etc. Thus, Epoxide A is made from 1 mol of p,p'-dihydroxydiphenyl dimethyl methane (Bisphenol A) and 10 mols of epichlorohydrin and has an epoxide equivalent of 190.

TABLE OF EPOXIDES

| Epoxide | Dihydric phenol | Mol ratio | | Epoxide equivalent |
|---|---|---|---|---|
| | | Epichlorohydrin | Dihydric phenol | |
| A | Bisphenol A | 10 | 1 | 190 |
| B | do | 1.57 | 1 | 485 |
| C | do | 1.22 | 1 | 925 |
| D | do | 1.15 | 1 | 1,800 |

Epoxide E is 3,4-epoxy-6-methylcyclohexylmethyl-3,4-epoxy-6-methylcyclohexane carboxylate, known in the trade as Epoxide 201 and manufactured by Union Carbide Chemicals Company.

The molecular weight of the above described epoxide resins is assumed for the purpose of this invention to be twice the epoxide equivalent.

Example 1

To a 2-liter flask equipped with stirrer, thermometer, reflux condenser and addition tube are added 121.2 parts of n-butyl alcohol, 200 parts of xylene and 2 parts of $BF_3$ etherate. Heat is applied raising the temperature of the reactants to 65° C. Addition of 478.8 parts of Epoxide A in 200 parts of xylene is begun and is added over a two-hour period, holding the temperature between 60° C. and 68° C. 20 parts of xylene are added to the solution, the temperature is raised to 100° C. and held between 100° C. and 105° C. for one hour. The $BF_3$ catalyst is deactivated by the addition of 20 parts of cation exchange resin and by heating the mixture for one hour at 100° C. The solution is then filtered.

This resin solution has a Gardner-Holdt viscosity at 25° C. of R at 56.5 percent solids in xylene. The percent polymer conversion is 96.2 percent, based on solids content.

This resin is the product of 1.3 mols of butyl alcohol and 1 mol of Epoxide A.

This resin solution is blended with 30 percent on solids basis of a 60 percent solution of a butylated urea-formaldehyde resin, and 0.4 percent by weight of the morpholine salt of butyl acid phosphate. Films are prepared from this blend on glass and electrolytic tin plate and are baked for thirty minutes at 150° C. Well cured films with excellent adhesion are obtained. These films exhibit no damage after immersion in 5 percent NaOH solution for four weeks. They have good hardness, gloss, flexibility and impact resistance.

Example 2

Using the same equipment as described in Example 1, 49.8 parts of allyl alcohol in 100 parts of xylene with 2 parts of $BF_3$ etherate are added to the flask. 250.2 parts of Epoxide A in 50 parts of xylene and 50 parts of methyl isobutyl ketone are added to the flask over a one-hour period while holding the temperature between 65° C. and 68° C. The reactants are heated for an additional hour at 100° C. The catalyst is deactivated with 20 parts of cation exchange resin as described in Example 1.

The resin solution has a Gardner-Holdt viscosity at 25° C. of T–U at 54.8 percent solids. The percent polymer conversion is 95.4 percent, based on solids determination.

This resin is the reaction product of 1.3 mols of allyl alcohol and 1 mol of Epoxide A.

Films prepared from this solution and 25 percent on a solids basis of a butylated urea-formaldehyde solution with 0.4 weight percent of the morpholine salt of butyl acid phosphate are well cured after a thirty-minute bake at 150° C. These films show no damage after four weeks immersion in 5 percent NaOH solution. They are hard, glossy and flexible and have good impact resistance and toughness.

Example 3

Using the same procedure as described in the previous examples, 81 parts of benzyl alcohol in 100 parts of xylene with 2 parts of $BF_3$ etherate are reacted with 219 parts of Epoxide A in 50 parts of xylene and 50 parts of methyl isobutyl ketone.

The resin solution has a Gardner-Holdt viscosity of V at 59.2 percent solids. The percent conversion to polymer is 97 percent.

This resin is the product of 1.3 mols of benzyl alcohol and 1 mol of Epoxide A.

The polymer solution is blended with 20 percent on solids basis of a butylated urea-formaldehyde resin and 0.4 weight percent of the morpholine salt of butyl acid phosphate. Films are prepared on glass and electrolytic tin plate and are baked for thirty minutes at 150° C. The well-cured films have excellent resistance to 5 percent NaOH solution, have good hardness, gloss, flexibility and impact resistance.

Holdt viscosity of G-H at 25° C., at 58.6 percent solids. The conversion to polymer is 97.8 percent.

The molar ratio of reactants are 1 mol of trimethylol propane diallyl ether to 1 mol of Epoxide A.

Films prepared from this polymer solution with 20 percent on a solids basis of an isobutylated melamine-formaldehyde resin and 0.4 weight percent of the morpholine salt of butyl acid phosphate are well cured after a thirty-minute bake at 150° C. These films are clear, have excellent mar resistance, high gloss and good flexibility.

Additional resins are prepared by reacting various alcohols with epoxide resins using the same procedures as has been described in the preceding examples. These reactants and the solvents used in the reactions as well as the viscosity of the resulting products are listed in the following table.

| Resin | Alcohol | Mols | Epoxide | Mols | Solvent | Percent solids | Gardner-Holdt viscosity at 25° C. |
|---|---|---|---|---|---|---|---|
| 1 | 2-ethyl hexanol | 1.3 | A | 1 | Xylene | 58.2 | T-U |
| 2 | Ethylene glycol phenyl ether | 1.3 | A | 1 | 3/1 Xylene MIBK | 57.9 | V |
| 3 | Hydroxyethyl methacrylate | 1.0 | A | 1 | MIBK | 62.3 | R |
| 4 | 2-hydroxy methyl-5-norbornene | 1.0 | A | 1 | 2/1 MIBK Xylene | 42.3 | M-N |
| 5 | Ethylene glycol nonyl phenol ether | 1.0 | A | 1 | MIBK | 64.2 | R-S |
| 6 | 2-ethyl hexanol | 1.0 | B | 1 | MIBK | 47.3 | X |
| 7 | do | 1.0 | C | 1 | MIBK | 29.2 | L |
| 8 | do | 1.0 | D | 1 | 1/1 MIBK Cellosolve Acetate | 30 | R-S |
| 9 | Allyl alcohol | 1.0 | E | 1 | MIBK | 55 | L |

MIBK—Methyl isobutyl ketone.

Example 4

To a one-liter flask equipped with stirrer, thermometer, reflux condenser and inlet tube are added 82.5 parts of hydroxypropyl methacrylate in 100 parts of methyl isobutyl ketone with 2 parts of $BF_3$ etherate. Heat is applied raising the temperature to 65° C. Addition of 217.5 parts of Epoxide A in 100 parts of methyl isobutyl ketone is begun and continued over a one-hour period holding the temperature at 65° C. The catalyst is deactivated by heating the resin solution with 20 parts of cation exchange resin for one hour holding the temperature between 80° C. and 82° C. After filtering, the resin solution has a Gardner-Holdt viscosity at 25° C. of P-Q at 62.6 percent solids. The conversion to polymer is 99.5 percent.

This resin is the reaction product of 1.0 mol of hydroxypropyl methacrylate and 1.0 mol of Epoxide A.

Films prepared from this polymer solution with 25 percent on a solids basis of a butylated urea-formaldehyde resin and 0.4 weight percent of the morpholine salt of butyl acid phosphate are well cured after a thirty-minute bake at 150° C. The films have excellent adhesion to glass and electrolytic tin plate, are flexible and exhibit excellent resistance to 5 percent NaOH solution and boiling water.

Example 5

Using the same procedure as described in the preceding example, 133 parts of linoleyl alcohol in 133 parts of xylene with 1 part of $BF_3$ etherate catalyst are reacted with 166 parts of Epoxide A in 166 parts of xylene. The resulting solution has a viscosity of M at 39.4 percent solids. The conversion to polymer is 98.5 percent based on solids determination.

The molar ratio of linoleyl alcohol to Epoxide A is 1.14 to 1.

Films prepared from this solution air dry to a tack-free stage in six to eight hours with the addition of cobalt and manganese driers. After three to five days dry time, the films are quite flexible, and are quite hard and mar resistant.

Example 6

This example is conducted using the same procedure as described in the proceding examples by reacting 36 parts of trimethylol propane diallyl ether in 40 parts of methyl isobutyl ketone, using 0.7 part of $BF_3$ etherate catalyst with 64 parts of Epoxide A in 26.7 parts of methyl isobutyl ketone. The resin solution has a Gardner- The products which result from the polymerization process of this invention are essentially high molecular weight polyhydric alcohols. These products are valuable compositions due to the presence of the hydroxyl groups which are reactive with many materials. Such materials are anhydrides, such as phthalic or maleic or acids such as lauric or palmitic. Particularly valuable products are obtained by reacting these high molecular weight polyhydric alcohols with unsaturated acids derived from drying oils. Such esterified products are useful in preparing air-drying and baking varnishes and enamels for use as protective coatings for wood, metal and other substances. Protective coatings are also prepared by reacting these polymeric polyhydric alcohols with cross-linking agents as hereinbefore described. These cross-linking agents can be polyisocyanates, such as tolylene diisocyanate, hexamethylene diisocyanate, diphenylmethane diisocyanate, etc., which are used in the range of 0.5 to 1.2 isocyanate groups per hydroxyl group; condensation products containing methylol groups and obtained from the reaction of formaldehyde with urea, melamine, benzoguanamine and phenol, which are used to make up 15 percent to 50 percent of the composition with the polyhydroxy compound; alkoxylated methylol compounds obtained by reacting formaldehyde and a monohydric alcohol such as methanol or butanol with urea, melamine, acetoguanamine, phenol and the like. Polyepoxides, such as the diglycidyl ether of Bisphenol A and dicyclopentadiene dioxide, can also be used to cross-link the polyhydroxy polyether resins of this invention.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for producing a soluble, fusible, high molecular weight polyhydroxy-polyether resin which comprises reacting:
   (A) a monohydric alcohol free of groups reactive with epoxide groups other than the hydroxyl group with
   (B) an epoxide resin having more than one to two 1,2 epoxide groups per molecule using a catalyst selected from the group consisting of boron trifluoride, aluminum chloride, stannic chloride, titanium chloride and sulfuric acid wherein (A) the monohydric alcohol and (B) the epoxide resin are in the ratio of 0.5 to 0.7 mol of (A) for each epoxide equivalent of (B).

2. The process of claim 1 wherein the monohydric alcohol and the epoxide resin are reacted in the ratio of 0.5 to 0.55 mol of alcohol for each epoxide equivalent of epoxide resin and wherein the reaction is carried out in a solvent selected from the group consisting of ketones, ethers and esters and mixtures thereof, each being free of active hydrogen groups reactive with epoxide groups.

3. The process of claim 1 wherein the epoxide resin contains a maximum of two aliphatic hydroxyl groups per molecule.

4. The process of claim 1 wherein the monohydric alcohol is linoleyl alcohol.

5. The process of claim 1 wherein the monohydric alcohol is hydroxypropyl methacrylate.

6. The process of claim 2 wherein the epoxide resin is the diglycidyl ether of p,p'-dihydroxydiphenyl dimethyl methane, the alcohol is n-butyl alcohol, the catalyst is boron trifluoride and the solvent is a ketone.

7. The process of claim 2 wherein the epoxide resin is 3,4 - epoxy - 6 - methylcyclohexyl-methyl-3,4-epoxy-6-methylcyclohexanecarboxylate, the alcohol is allyly alcohol, and the solvent is methyl isobutyl ketone.

8. The cured composition resulting from a blend of the reaction product of claim 6 with a soluble, fusible aminoplast resin.

9. The cured composition resulting from a blend of the reaction product of claim 6 with a polyisocyanate compound containing a pluriality of unreacted isocyanate groups.

References Cited

UNITED STATES PATENTS 2,700,030   1/1955   Widmer et al. _____ 260—47

WILLIAM H. SHORT, *Primary Examiner.*

T. D. KERWIN, *Assistant Examiner.*

U.S. Cl. X.R.

117—161; 260—2, 18, 31.4, 32.8, 33.2, 33.6, 47, 75, 77.5, 78.4, 613, 830, 831